(12) United States Patent
Lv (10) Patent No.: US 8,562,045 B2
(45) Date of Patent: Oct. 22, 2013

(54) LOCKING ARRANGEMENT AND CULINARY UTENSIL COMPRISING SAME (71) Applicant: Maxpat Trading and Marketing (Far East) Limited, Kowloon (HK)

(72) Inventor: Bing Yuan Lv, Guangdong (CN)

(73) Assignee: Maxpat Trading and Marketing (Far East) Limited, Tsimshatsui, Kowloon (HK)

( * ) Notice: Subject to any disclaimer, the term of this patent is extended or adjusted under 35 U.S.C. 154(b) by 0 days.

(21) Appl. No.: 13/647,537

(22) Filed: Oct. 9, 2012

(65) Prior Publication Data
US 2013/0049386 A1 Feb. 28, 2013

Related U.S. Application Data (63) Continuation-in-part of application No. 13/491,770, filed on Jun. 8, 2012, which is a continuation-in-part of application No. 13/222,417, filed on Aug. 31, 2011, now Pat. No. 8,226,135.

(51) Int. Cl.
*A47G 21/10* (2006.01)
*A47J 43/28* (2006.01)
(52) U.S. Cl.
USPC ............................................ 294/16; 294/99.2

(58) Field of Classification Search
USPC ......... 294/16, 99.2, 5, 7, 8, 8.5, 33, 100, 106, 294/110.1; D7/686
See application file for complete search history.

(56) References Cited

U.S. PATENT DOCUMENTS

| 5,121,956 | A | * | 6/1992 | Horkey | 294/99.2 |
| 6,056,338 | A | * | 5/2000 | Kerr | 294/16 |
| 6,092,847 | A | * | 7/2000 | Kwan | 294/16 |
| 7,086,676 | B2 | * | 8/2006 | Sumter et al. | 294/16 |
| 7,316,434 | B1 | * | 1/2008 | Kerr | 294/16 |
| 7,637,547 | B2 | * | 12/2009 | Schneider | 294/16 |

* cited by examiner

*Primary Examiner* — Paul T Chin
(74) *Attorney, Agent, or Firm* — Heslin Rothenberg Farley & Mesiti P.C.

(57) ABSTRACT

The present invention is concerned with a locking arrangement having a first member and a second member, each having a front end and a rear end and with the first member and the second member connected together at a first pivot axis, a front portion, a rear portion and a locking mechanism. The locking mechanism includes a lever and a guide. The arrangement is configured to assume one of two configurations in that in a first configuration the lever is engaged in a first position due to orientation of the arrangement such that the first arm and the second arm are locked against each other, or in a second configuration in which the lever having been disengaged from the first position, or engaging or engaged in the second position, due to orientation of the apparatus such that the first arm and the second arm are movable relative to each other.

20 Claims, 10 Drawing Sheets

Section A-A'

VIEW:X

LOCKING ARRANGEMENT AND CULINARY UTENSIL COMPRISING SAME

CROSS-REFERENCE TO RELATED APPLICATIONS

The present application is a continuation-in-part application from U.S. patent application Ser. No. 13/491,770 filed Jun. 8, 2012, which is a continuation-in-part application from U.S. patent application Ser. No. 13/222,417 filed Aug. 31, 2011, now U.S. Pat. No. 8,266,135. The contents of both applications are incorporated in the present application herein in their entireties.

FIELD OF THE INVENTION

The present invention is concerned with a locking arrangement and a utensil comprising such arrangement; the invention is in particular concerned with but not limited to a culinary utensil comprising such arrangement. The culinary utensil may be a pair of tongs or clamp.

BACKGROUND OF THE INVENTION

There are a variety of conventional tong- or clamp-like utensils for picking up an object. In the context of culinary utensils, for example a pair of culinary tongs, the tongs may be used for picking up food objects. Such utensils typically would have a pair of arms or extensions connected together at a pivot joint. A biasing means may be provided to bias the arms to a far apart configuration. In use, when a food object is to be picked up the arms are firstly allowed to be spread apart. The utensil is positioned such that the front ends of the arms sandwich the food object and then the arms are squeezed together so as to engage with the food object. In order to maintain the position of the food object between the arms, the arms have to be held firmly together by the fingers and the palm of a user. This can be difficult in particular if the means for biasing the arms apart are particularly strong because the fingers and the palm would have to act against the biasing force of the biasing means. The holding of the arms together would be particularly difficult if the food object being held is heavy or slippery or the food object is to be held for a prolonged period of time.

Another problem with conventional tong- or clamp-like utensils is that when they are not in use, the arms are biased to spread apart. As such, the utensils become larger and difficult to stow. One solution has been for example to provide a ring for holding the arms together. However, the ring can be difficult to maneuver and is generally not reliable and it is not aesthetically pleasant either.

It may be possible to introduce an actuation lock so that on pressing, sliding or pulling of a switch thereof the arms can be locked to stay close together. However, the working of such switch can be adversely interfered when the utensil is used to pick with food objects with grease or sauce. The grease or sauce can hinder working of moving parts or the switch. Further, maneuvering food with such utensil and controlling locking or unlocking of the arms simultaneously can be difficult.

The present invention seeks to address the above problems or at least to provide an alternative to the public.

SUMMARY OF THE INVENTION

According to a first aspect of the present invention, there is provided a tong or clamp apparatus for picking up an object, comprising a) a first member having a front end in the form of a first elongate arm and a rear end, b) a second member having a front end in the form of a second elongate arm and a rear end, the first member and the second member are pivotably connected together at a first pivot axis, c) a utility portion, and d) a rear portion including a locking mechanism for controlling configuration of the apparatus, wherein the locking mechanism includes i) a lever pivotably connected to the apparatus and adapted to take a swinging course between a first position and a second position, in that in the first position the first arm and the second arm may be locked together and in the second position the first arm and the second arm are allowed to be freely movable relative to each other and ii) a guide defining a region at which the lever is movable within a range of distance, and wherein the apparatus is configured to assume 1) a first configuration in which the lever is engaged in the first position due to orientation of the apparatus and the effect of gravity on the lever such that the first arm and the second arm are locked against each other from movement, and 2) a second configuration in which the lever having been disengaged from the first position, or engaging or engaged in the second position, due to orientation of the apparatus and the effect of gravity on the lever such that the first arm and the second arm are movable relative to each other.

Preferably, when the apparatus is oriented with the utility portion downwardly pointing and the rear portion upwardly pointing, the lever may be positioned above the first pivot axis.

In an embodiment, the lever may be pivotably connected at the rear portion of the apparatus.

In one embodiment, the lever may be relatively thin and generally resemble a plate.

Advantageously, the lever may be pivotably movable at a second pivot axis substantially parallel to the first pivot axis. The rear end of the first member may be provided with an end plate to which the lever is pivotably connected. The lever may be pivotably connected to the end plate via a protrusion member extending from the end plate.

Suitably, the rear end of the second member may include the guide. The region may be elongate in profile and arch shaped, and in use the lever may be movable at the region of the guide. In an embodiment, the region of the guide may be provided with a first end and a second end, the first end and the second end may be disposed on opposite sides of the elongate guide.

In one embodiment, the lever may be generally elongate in shape and act as a stopper, and wherein, in use, when the lever may act on the first end of the region of the guide the first arm and the second arm are locked against each other.

Suitably, the lever may generally resemble the English letter "T" or inverted "T".

In use, when the apparatus assume the first configuration, the apparatus may be adapted to hold an object between the first and second arms, and in the second configuration the apparatus may be adapted to arrange with the object positioned between the first and second arms or to release the object from the apparatus.

In one embodiment, the rear end of the apparatus may be configured to resemble a socket defining a cavity for containing the locking mechanism. Specifically, the lever and the guide may be concealed in the socket from the socket at least visually.

Excluding the guide, the first member and the second member of the apparatus may be free of means or moving parts for engaging the lever in position.

The apparatus may be a pair of culinary tongs.

According to a second aspect of the present invention, there is provided a tong or clamp apparatus for picking up an object, comprising a) a first member having a front end in the form of a first elongate arm and a rear end, b) a second member having a front end in the form of a second elongate arm and a rear end, the first elongate arm and the second elongate arm are pivotably connected together at a first pivot axis, c) a utility portion, and d) a rear portion including a locking mechanism for controlling configuration of the apparatus, wherein the locking mechanism includes a pivotable member and a guide for restricting movement of the pivotable member, and wherein the apparatus is configured to assume i) a first configuration in which the pivotable member is engaged in a first position due to orientation of the apparatus such that the first member and the second member are locked against each other from movement, and ii) a second configuration in which the pivotable member having been disengaged from the first position, or engaging or engaged in the second position due to orientation of the apparatus such that the first member and the second member are movable relative to each other.

Preferably, the pivotable member may generally be elongate in profile and pivotably connected to the rear end of the apparatus, and act as a stopper such that when a distal end of the lever acts on the guide the first member and the second member are locked against each other to prevent relative movement thereof.

According to a third aspect of the present invention, there is provided a locking arrangement for locking two movable parts together or unlocking the two movable parts from each other, comprising a) a first member having a front end and a rear end, b) a second member having a front end and a rear end, the first member and the second member are connected together at a first pivot axis at the rear ends thereof, c) a front portion, and d) a rear portion including a locking mechanism for controlling configuration of the arrangement, wherein the locking mechanism includes a pivotable member and a guide for controlling movement of the pivotable member, wherein the arrangement is configured to assume i) a first configuration in which the pivotable member is engaged in a first position due to orientation of the arrangement such that the first member and the second member are locked against each other from movement or ii) a second configuration in which the pivotable member having been disengaged from the first position, or engaging or engaged in the second position, due to orientation of the arrangement and the effect of gravity on the pivotable member such that the first member and the second member are movable relative to each other; and wherein the pivotable member acts as a stopper such that when the pivotable member acts on the guide the first member and the second member are locked against each other to prevent relative movement thereof.

According to a fourth aspect of the present invention, there is provided a locking arrangement for locking two movable parts together or unlocking the two movable parts from each other, comprising a) a first member having a front end and a rear end, b) a second member having a front end and a rear end, the first member and the second member are connected together at a first pivot axis at the rear ends thereof, c) a front portion, and d) a rear portion including a locking mechanism for controlling configuration of the arrangement, wherein the locking mechanism includes a pivotable member and a guide for controlling movement of the pivotable member, and wherein the arrangement is configured to assume i) a first configuration in which the pivotable member is engaged in a first position due to orientation of the arrangement such that the first member and the second member are locked against each other from movement or ii) a second configuration in which the pivotable member having been disengaged from the first position, or engaging or engaged in the second position, due to orientation of the apparatus and the effect of gravity on the pivotable member such that the first member and the second member are movable relative to each other.

BRIEF DESCRIPTION OF DRAWINGS

Some embodiments of the present invention will now be explained, with reference to the accompanied drawings, in which:

FIG. 4b is schematic cross section view showing a portion of FIG. 4a;

DETAILED DESCRIPTION OF PREFERRED EMBODIMENTS OF THE INVENTION

The present invention is concerned with a locking arrangement, a locking mechanism or a locking structure, and a utensil comprising such an arrangement, mechanism or structure. The use of terms "arrangement", "mechanism" and "structure" hereinafter is interchangeable.

Figure 1:
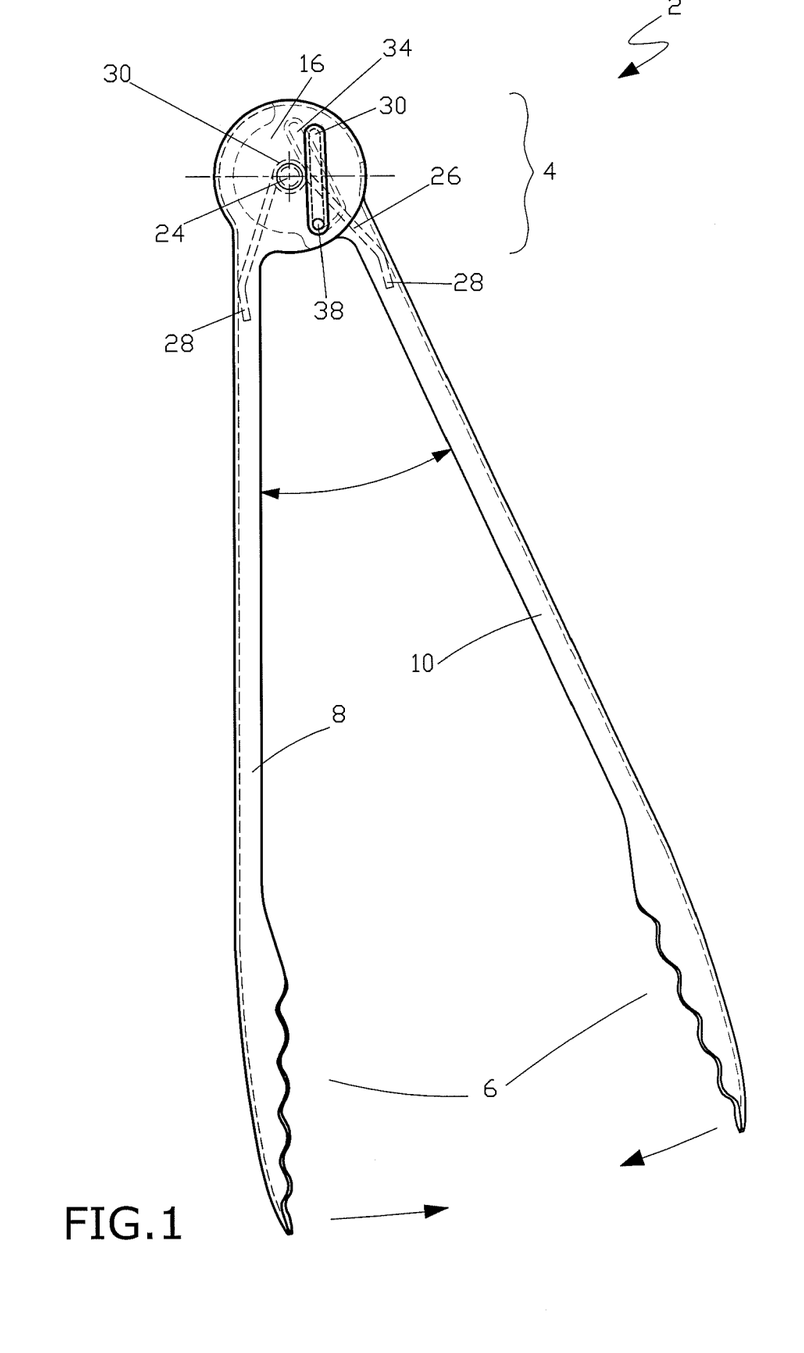
FIG. 1 is a schematic side view showing a first embodiment of a pair of culinary tongs disposed in a certain configuration according to the present invention.

FIG. 1 is a schematic view of a pair of culinary tongs, generally designated 2, according to an embodiment of the present invention. This schematic view depicts an image of the tongs 2 when viewed from a side thereof although the interior construction of a joint and a locking arrangement of the tongs 2 located at its rear portion 4 are also depicted schematically.

Figure 2:
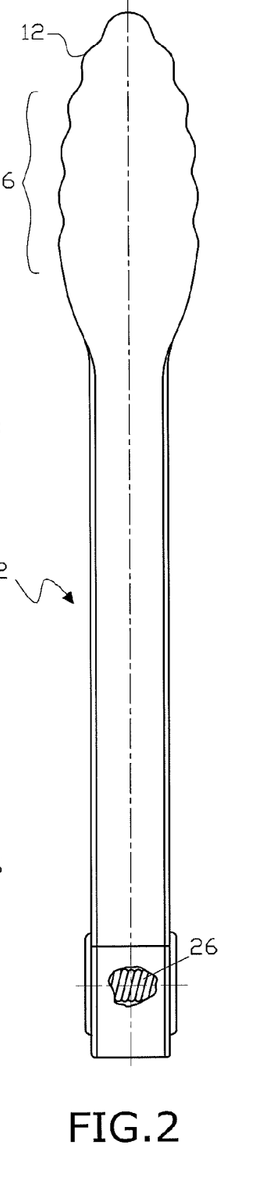
FIG. 2 is a schematic side view of the culinary tongs in FIG. 1 but showing tongs in another configuration.
Figure 5:
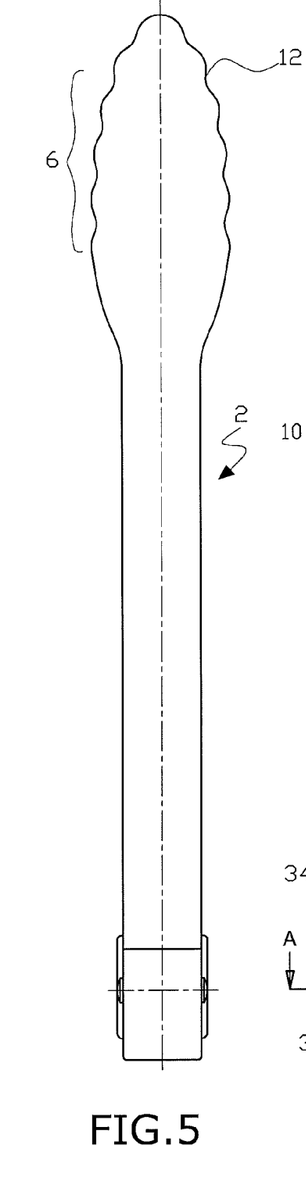
FIG. 5 is another schematic side view showing the culinary tongs of FIG. 2.

The tongs 2 comprise a front portion or a utility portion 6 having a first arm 8 and a second arm 10. The first arm 8 and the second arm 10 are made of stainless steel plates which have been stamped to conform to a particular shape and curvature. Specifically, in this embodiment, the arms 8, 10 have a predetermined wider front end 12 (also shown in FIGS.

2 and 5) which facilitates picking up of a food object. The corrugated edging 14 at the front end 12 of the arms 8, 10 also facilitates the picking up of a food object.

Figure 3:
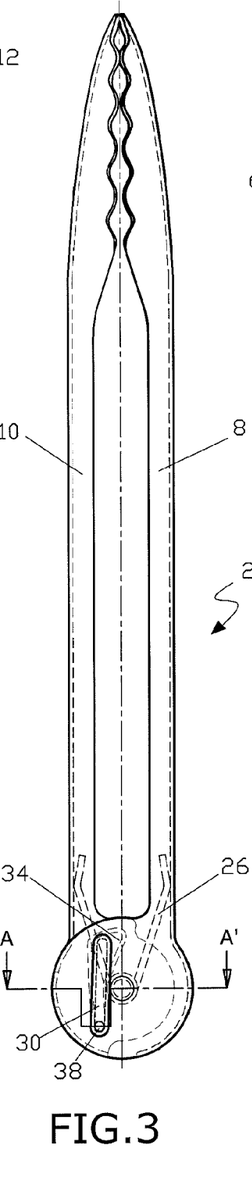
FIG. 3 is another schematic side view of the culinary tongs of FIG. 2 but showing more details of the tongs.

The rear portion 4 of the tongs 2 serves as a handle portion onto which a user grasps in use. The handle portion 4 contains a construction in which a locking mechanism resides. The rear portion 4 of the first arm 8 has a pair of flange-like walls or plates 16, 18 (see also FIG. 4) arranged on opposite lateral sides thereof. In this embodiment, the walls 16, 18 are generally circular in profile, as shown in FIGS. 1 and 3. The rear portion 4 of the second arm 10 similarly has a pair of walls or plate 20, 22 (see FIG. 4a) arranged on opposite lateral sides thereof. The rear portion 4 of the tong 2 is configured such that the walls 20, 22 of the second arm 10 are sandwiched by the walls 16, 18 of the first arm 8.

The first arm 8 and the second arm 10 are pivotably connected together by a pivot pin 24 extending from one lateral side thereof to the opposite side and defining a pivot axis, as shown in FIGS. 1 to 5. With the pivot pin 24, it is to be understood that the first arm 8 and the second arm 10 are pivotably movable relative to each other at the pivot pin 24 within a predetermined range, as shown by the arrows in FIG. 1. The first arm 8 and the second arm 10 while being movable relative to each other cannot spread apart beyond the predetermined range when rear edges of the first arm 8 and the second arm 10 abut each other.

The tongs 2 are provided with means for biasing the first arm 8 and the second arm 10 away from each other. In this embodiment, the biasing means takes the form of a wire spring 26 with a shape generally resembling the English letter "V". Please see FIGS. 1, 2 and 3. The wire spring 26 has two legs 28 and a spring coil 30. The two legs 28 abut an inner surface of the rear end of the first arm 8 and an inner surface of the rear end of the second arm 10, respectively. Due to the inherent biasing nature of the wire spring 26, the arms 8, 10, in the absence of other interference, are biased away from each other, as shown in FIG. 1. As can be seen from the figures and in particular FIG. 4a, the pivot pin 24 extends through the walls 16, 20, the spring wire 30 of the spring 26 and the walls 22, 18 and the wire spring 26.

Figure 4A:
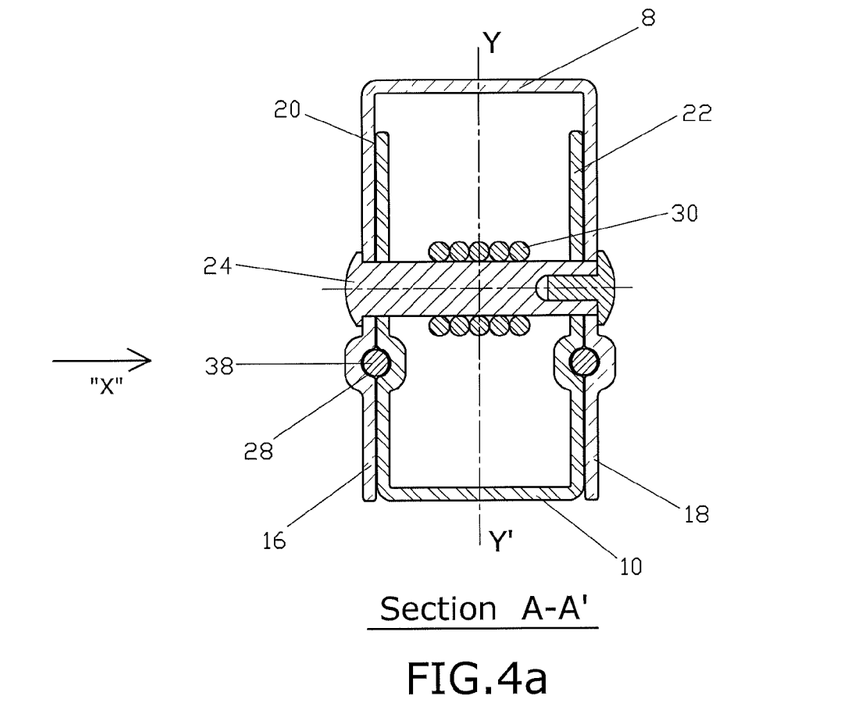
FIG. 4a is a schematic cross section view of a rear end of the culinary tongs taken at A-A' of FIG. 3.
Figure 4B:
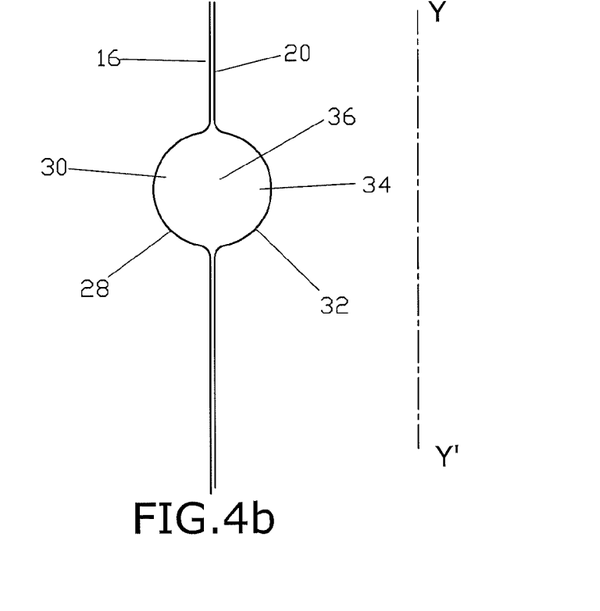

Referring to FIGS. 4a and 4b, the tongs 2 are provided with the locking arrangement which serves to control the locking status thereof. The locking arrangement makes use of the walls 16, 18 of the first arm 8 and the walls 20, 22 of the second arm 10. Each wall 16, 18 of the first arm 8 is configured such that there is provided a bulge 28. In this embodiment, when the tongs 2 are viewed from the side designated by "X" in FIG. 4a, the bulge 28 resembles a protrusion. However, it is to be understood from FIGS. 4a-b that the opposite side of the bulge 28 takes the form of a groove 30. The groove 30' is elongate in shape and has a substantially equal width, and extends from a rear part of the wall 16 to a front part of the wall 16. The elongate groove 30 generally defines a longitudinal axis which is generally in parallel to the longitudinal axis of the first arm 8.

The walls 20, 22 of the second arm 10 is configured such that there is also provided with a similar bulge 32 defining a protrusion on one side (outwardly facing side) and a groove on the opposite side (inwardly facing side). The difference between the bulge 28 of the wall 16 of the first arm 8 and the adjacent bulge 32 of the wall 20 of the second arm 10 is that the protrusion of the bulge 28 of the first arm 8 points away from the tongs 2 (or a central axis Y-Y') while the protrusion of the bulge 32 of the second arm 10 points into the tongs 2 (or towards the central axis Y-Y'. In other words, the surface of the wall 16 of the first arm 8 defining the groove 30 is inwardly facing (towards the central axis Y-Y') while the surface of the wall 20 of the second arm 10 defining a groove 34 is outwardly facing (away from the central axis Y-Y'. It is to be noted that the meaning of "outwardly" and "inwardly" used herein merely serves to designate the relative orientation and does not limit the meaning to a particular orientation.

As shown in FIG. 4b, the grooves 30, 34 of the walls 16, 20 together define a channel 36 for accommodating a movable member, e.g. a ball bearing 38 in this embodiment.

Referring to FIGS. 1 and 3, it is however to be noted that the grooves 30, 34 are different in a further aspect. While the groove 30 of the first wall 16 is elongate in shape with a generally equal width cross its length, the groove 34 of the second wall 20 is also elongate is shape but with a narrower rear end 38 and a wider front end 40. The wider front end of the groove 34, as shown in FIGS. 1 and 2, resembles a fan shaped configuration. Despite the different configurations of the grooves 30, 34, the grooves 30, 34 are however positioned adjacent each other and together they define the channel 36 for accommodating the ball bearing 38 which is movable therein. The ball bearing is sized to fit and slidable therein, and it would not fall out of the channel 36. In this embodiment, the channel is enclosed for accommodating the ball bearing. One advantage of this enclosed configuration is to minimize interference on the operation of the ball bearing. It is also to be noted that the channel extends across the pivot axis of the pivot joint. As shown in FIG. 4a, in this embodiment the left rear portion of the tongs 2 is generally symmetrical to that of the right rear portion of the tongs 2. The working of the locking arrangement is now explained as follows.

FIG. 1 illustrates a first configuration of the tongs 2 in which the arms 8, 10 are not locked against movement relative each other. In this configuration, the tongs 2 are oriented with the front portion 6 or the arms 8, 10 pointing towards the ground and the rear portion 4 pointing upwardly. In other words, the front portion 6 is situated below the pivot pin 24 or the channel 36. By situating below, it means the front portion is situated at a level which is below the level of the pivot pin 24 or the channel 36. It can be seen that due to gravity the ball bearing 38 is positioned at the lowest end of the channel 36 or a forward end of the channel 36 and the arms 8, 10 are biased apart by the wire spring 26. As long as the ball bearing 38 stays in this lowest or forward position in the channel 36, the arms 8, 10 can be brought together freely by squeezing thereof. When the squeezing action is removed the arms 8, 10 return to a biased spread apart configuration. This is because in this configuration the ball bearing 38 is situated in a position which is out of the path of relative movement of the walls. It means that when the tongs 2 are oriented with the front portion 6 situated below the channel 36 and a food object is situated between the front end of the arms 8, 10, the arms 8, 10 can be brought together with a squeeze, or when the action of the squeeze is removed the food object can be released. In other words, in this orientation, food can be picked up or released freely because the locking arrangement is not activated.

FIG. 3 illustrates a second configuration of the tongs 2 in which the arms 8, 10 are brought close to and adjacent each other and they are locked against movement relative each other. In this configuration, the tongs 2 are oriented with the front portion 6 or the arms 8, 10 pointing away from the ground and the rear portion 4 pointing downwardly. In other words, the front end 6 of the arms 8, 10 is situated above the channel 36. It can be seen that the ball bearing 38 is positioned at the other end (or the opposite end) or the rear end of the channel 36 and the arms 8, 10 stay close together despite the biasing action of the spring 26. This is because the ball bearing 38 is situated in a location in the channel 36 where it blocks the relative movement of the walls 16, 20. As long as the ball bearing 38 stays in this rear or back position (e.g. when the arms are upwardly pointing) in the channel 36 due to gravity to the ball bearing 28, the arms 8, 10 cannot be spread apart. This is because the ball bearing 38 is located in the path of relative movement of the walls 8, 10. This configuration is suitable when a food object is being held between the arms 8, 10 or when the tongs 2 have been stowed away. In this orientation, food can be held between the arms 8, 10 because the locking arrangement has been activated. It is to be understood that the tongs 2 do not have to point upwardly and vertically to effect the locking status. As long as the front portion of the tongs 2 is situated above the channel, the same locking status can be achieved. The locking can be released by orienting the tongs 2 such that the front end 6 of the tongs 2 point downwardly or when the front end 6 is situated below the channel 36. With this orientation, the front end 6 of the tong 2 is situated below the channel 36, and a slight squeeze of the arms 8, 10 can unlock the locking mechanism. This is because when the orientation is changed accordingly and the arms 8, 10 are slightly squeezed together, the ball bearing 38 is released and becomes movable within the channel 36. By gravity the ball bearing 38 rolls from the rear end of the channel 36 to the front end of the channel 36.

In this embodiment, the arms 8, 10 are adapted to be locked in a position half way between a fully spread apart position and a fully closed position. This is achieved by squeezing or bringing and holding the arms 8, 10 to a desired relative position and then orienting the tongs 2 such that the arms 8, 10 point upwardly to the extent that the front portion 6 is situated above the channel 36. Once this is done the desired relative position of the arms 8, 10 can be maintained with, for example, the food object held between the arms 8, 10 until the locking arrangement is unlocked.

In this embodiment, each of the first arm 8, the second arm 10, the first groove 30 and the second groove 34 generally defines a longitudinal axis. In the second configuration, the longitudinal axis of the first arm 8 and the longitudinal axis of the first groove 38 or in the second configuration the longitudinal axis of the first arm 6 and the longitudinal axis of the second groove are generally in parallel with each other. In alternative embodiments, this is not necessarily so in that the grooves or the channel may be positioned differently in relation to the arms. In such other embodiments, the locking or unlocking of the locking arrangement is however still determined by the orientation of the channel or the position of the ball bearing. When the ball bearing is positioned in a location or an end of the channel due to gravity where movement of the walls are blocked by the ball bearing the locking arrangement is in its locked position. On the other hand, when the ball bearing is positioned in a location or an (the other) end of the channel (e.g. having a groove with a widened width) the walls are not blocked the locking arrangement is in its unlocked position.

In the above embodiment, the locking arrangement has two pair of walls and two ball bearings in that one wall from each pair of walls and the respective ball bearing act as a locking mechanism. In other words, there are two parallel locking mechanisms on opposite sides of thereof. However, in an alternative embodiment a similar locking arrangement may be provided in which only one pair of adjacent walls and one ball bearing is provided. Such alternative embodiment would also work.

It is envisaged that the above described locking arrangement has only one moving part, i.e. the ball bearing. Manipulation of the moving part is effected by merely positioning the utensil in a certain orientation. The ball bearing is enclosed in a channel not easily accessible by, for example, grease, sauce, etc. The channel effectively serves as an enclosed chamber to insulate the ball bearing from the surroundings. Thus, there is a minimal chance that the arrangement would malfunction.

FIGS. 6-14 illustrate another embodiment of a pair of culinary tongs according to the present invention. The tongs, generally designed 52 are similar to the tongs 2 in some ways but are different in others. The following illustration focuses on the differences between the tongs 52 and the tongs 2.

Figure 6:
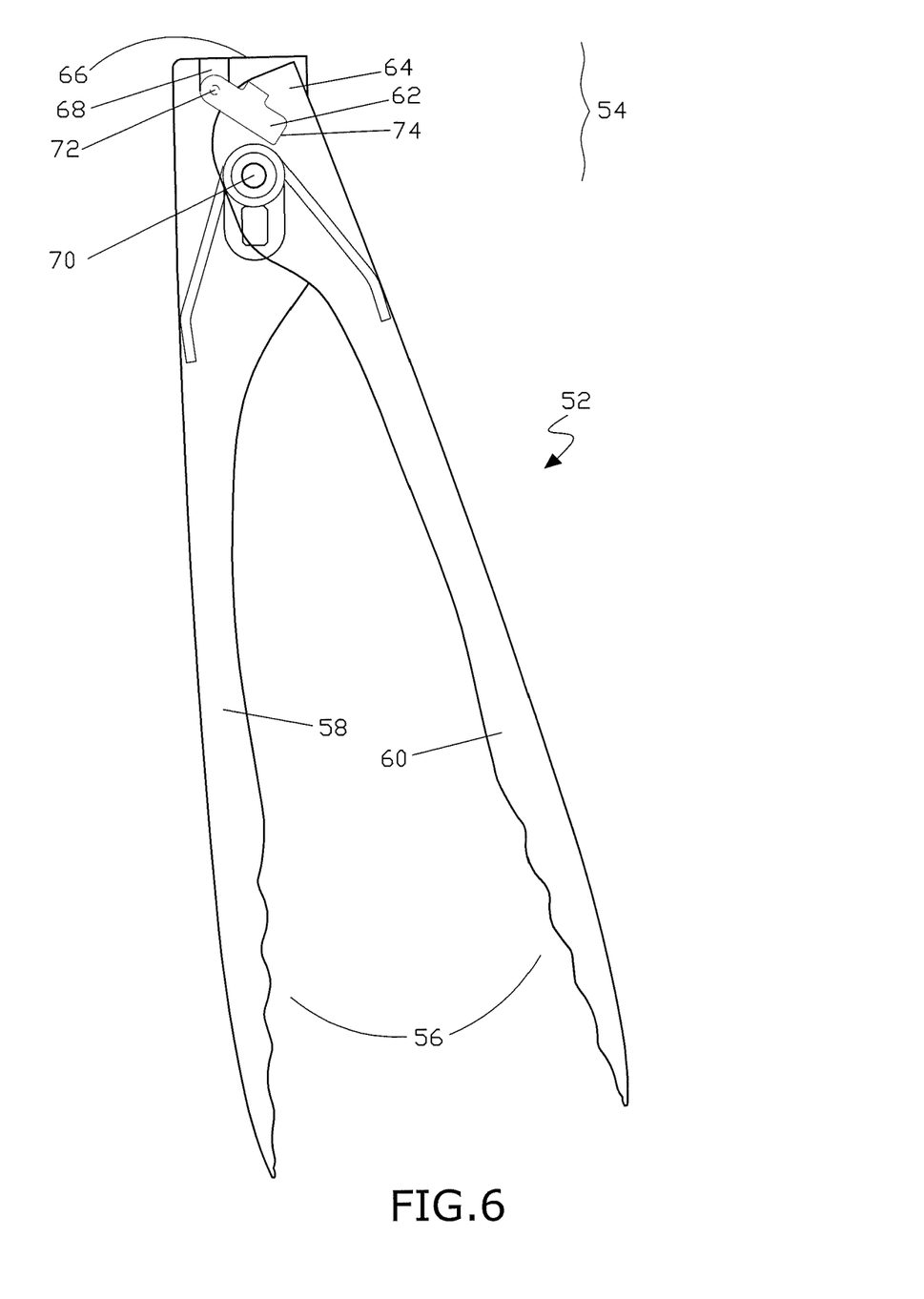
FIG. 6 is a schematic side view showing a second embodiment of a pair culinary tongs disposed in a certain configuration according to the present invention.

Referring in particular to FIG. 6, the tongs 52 similarly comprise a utility portion 56 at the front and a rear portion 54, and have a pair of members connected at the rear portion at a first pivot axis. The front ends of the members resemble a first arm 58 and a second arm 60, respectively. The arms 58, 60 are likewise biased by default by an expansion means to a far apart configuration. A rear end of the second arm 60 is partly received in a rear end of the first arm 58. The tongs 52 are configured in a way such that in the far apart configuration an end region of the second arm end 60 abuts an end region of the first arm 58 so as to limit the extent of the spreading of the two members.

The tongs 52 comprise a locking mechanism similar to the locking mechanism of the tongs 2 in that both locking mechanisms operate in response to the orientation of the tongs or in response to the effect of gravity on a movable element in the tongs. There are however differences. Specifically, in this embodiment, the locking mechanism includes a pivotable member in the form of a lever 62 and a guide 64 which cooperates with the lever 62. The rear end of the first member is provided with a generally planar end plate 66 from which a connection member 68 in the form of a protrusion depends towards the first pivot axis 70. In this embodiment, the lever 62 is generally elongate in profile and is provided with one end pivotably joined to the connection member 68 at a second pivot axis 72. The opposite end of the lever, or a distal end 74, is configured to engage with the guide 64 and acts as a stopping means for maintaining the tongs 52 in a locked configuration. (Please see FIG. 8) In this embodiment, the second pivot axis 72 and the first pivot axis 70 generally are arranged in parallel to each other. Due to the pivotable joint at the second pivot axis 72, the lever 62 is movable in a swinging course from one side to another.

Figure 11:
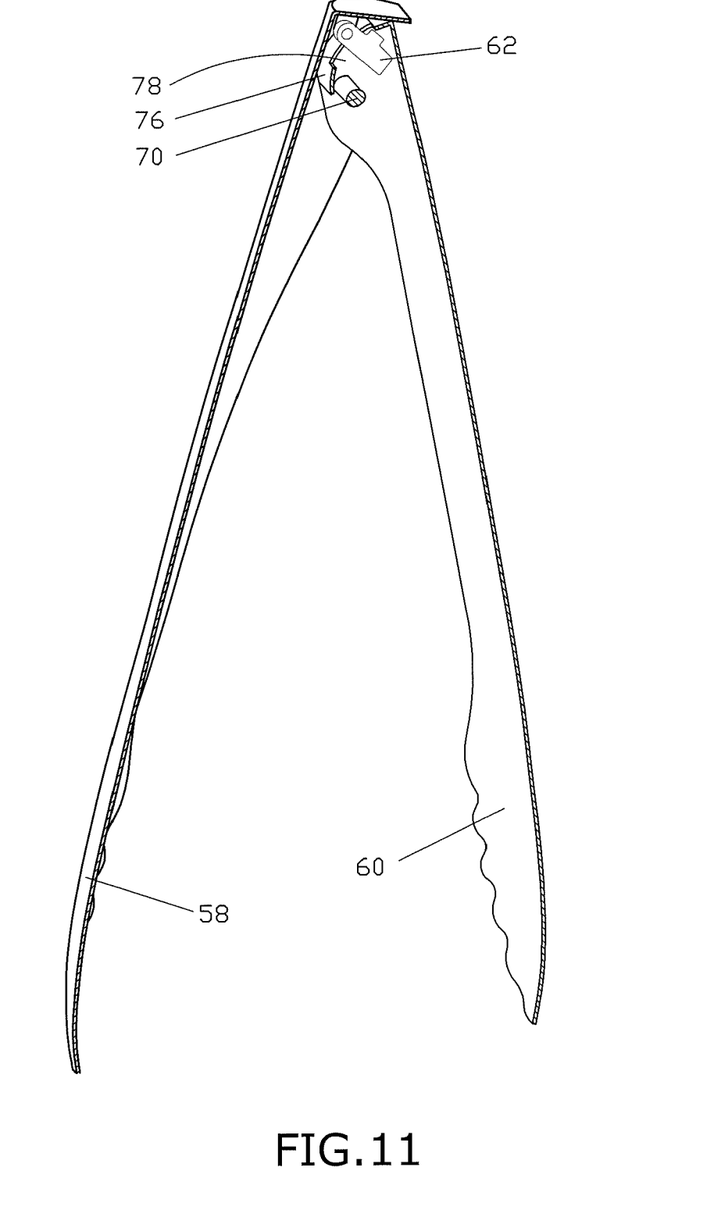
FIG. 11 is a perspective view schematically illustrating half of the tongs shown in FIG. 6.
Figure 12:
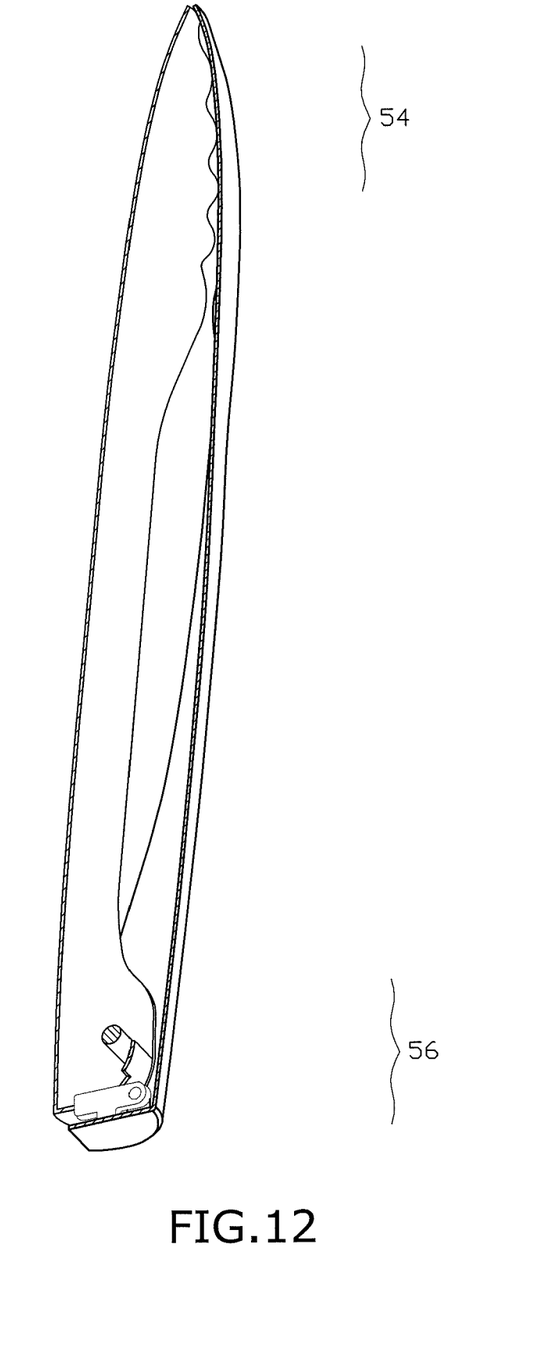
FIG. 12 is a perspective view similarly schematically illustrating half of the tongs shown in FIG. 6 but disposed in an alternative (locked) configuration.

Referring to FIGS. 11 and 12, the guide 64 of the locking mechanism is configured to take the form of a curved plate 76 defining a concave facing the second pivot axis 74. The plate 76 is provided with an elongate slot 78 at a centre region thereof. The plate 76 is formed from the rear end of the second arm 60 and is positioned such that the elongate slot 78 forms an opening within which the lever 62 is movable in a swinging and reciprocating manner in use.

FIGS. 6 and 11 illustrate a configuration in which the arms 58, 60 of the tongs 52 are biased to spread apart. In this configuration, the rear portion 54 is upwardly positioned and the front portion 56 is downwardly positioned. Accordingly, due to this particular orientation of the tongs 52, the distal end of the lever 74 moves or is movable away from the end plate 66 of the first member, disengages from the guide 64 and moves towards the first pivot axis 70 in response to the effect of gravity on the lever 62. Once the lever 62 has disengaged from the guide 64, the first arm 58 and the second arm 60 are freely squeezable towards each other or biased away from each other as long as the tongs 52 maintains this orientation. In other words, the tongs 52 have assumed an unlocked configuration. It can be envisaged that in this configuration an object can be picked up and held between the arms. If the tongs 52 in a locked configuration are oriented with the rear portion 54 upwardly positioned and the front portion 56 downwardly positioned, a slight squeeze of the arms 58, 60 together will disengage the lever 62 from the guide 64 and allow it to move away towards the first pivot axis, thus unlocking the arms 58, 60 from each other.

Figures 7, 8, 9:
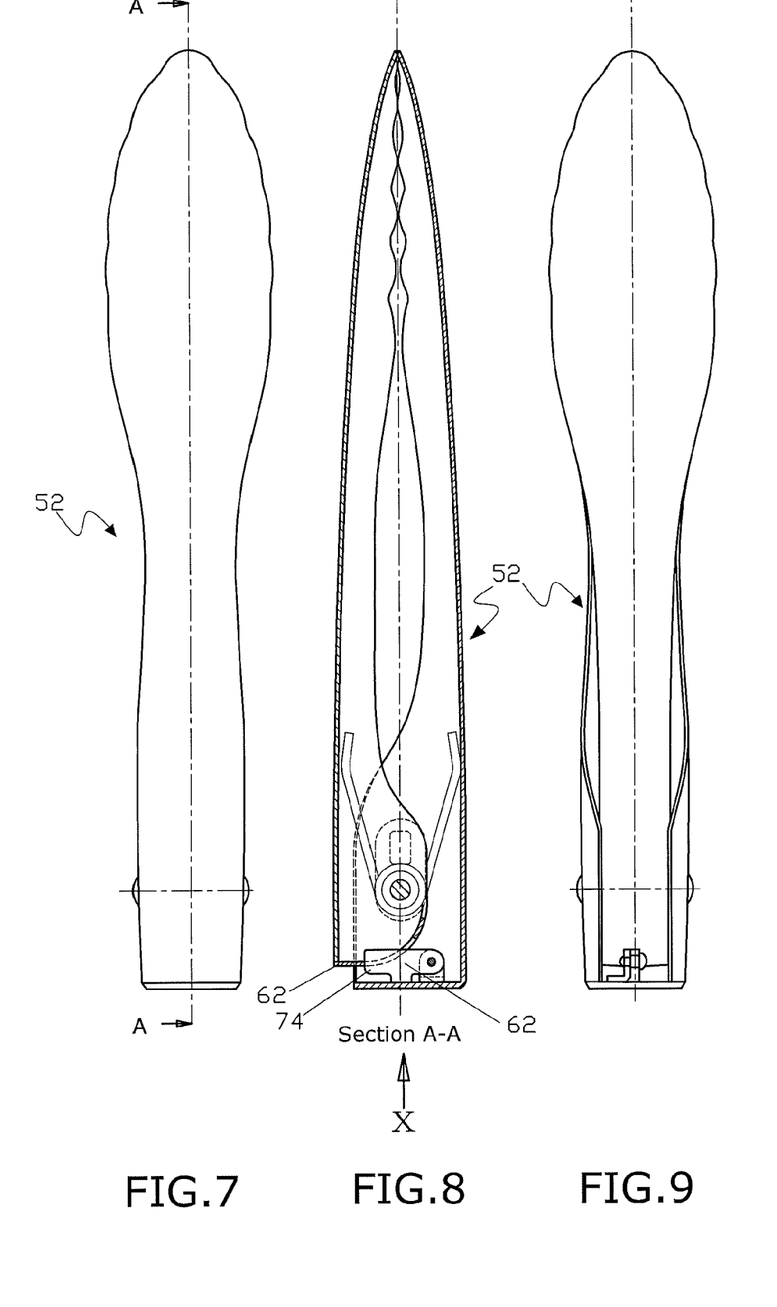
FIG. 7 is a side view showing the culinary tongs of FIG. 6.
FIG. 8 generally corresponds to FIG. 6 but showing the tongs disposed in an alternative (locked) configuration and more details of the tongs.
FIG. 9 corresponds to FIG. 8 but showing another side view thereof.
Figure 10:
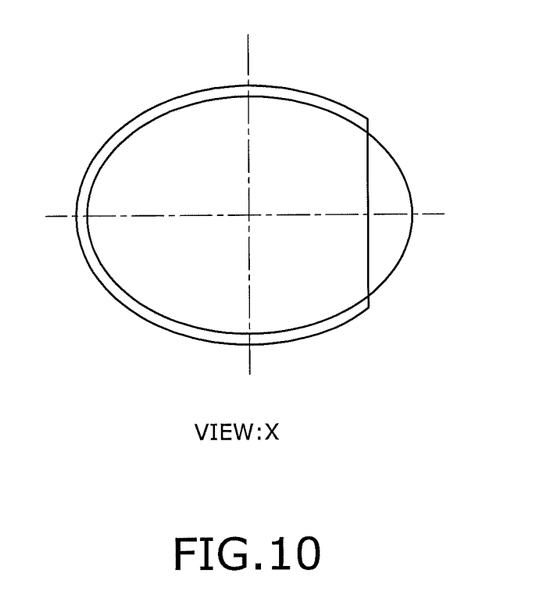
FIG. 10 is an end view of the tongs of FIG. 6.

FIGS. 8 and 12 illustrate a different configuration in which the arms 58, 60 of the tongs 52 are squeezed together. In this configuration, the rear portion 56 is downwardly positioned and the front portion 54 is upwardly positioned. It can be seen in FIG. 8 that due to the biasing action of the expansion means the distal end 74 of the lever 62 engages and presses against the guide 64. According, the arms 58, 60 of the tongs 52 are locked against each other. As long as the tongs 52 maintain this configuration the tongs 52 will stay in this locked configuration. The tongs 52 will continue to stay locked even when the tongs 52 are turned upside down; however, a slight squeeze of the arms can overcome the locking of the arms 58, 60.

Figure 13:
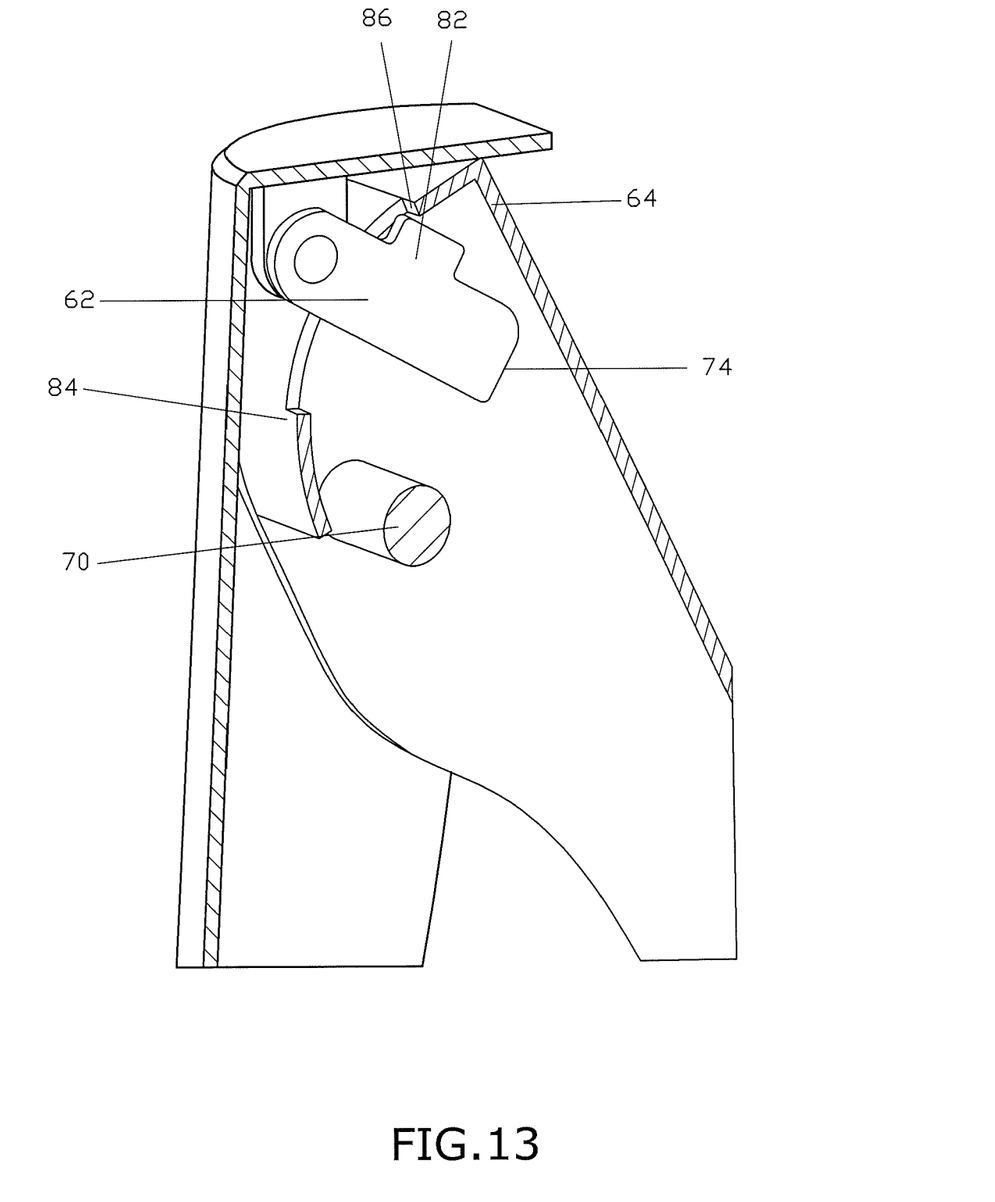
FIG. 13 is an enlarged perspective view showing locking mechanism of the tongs of FIGS. 6 and 11 disposed in an unlocked configuration.
Figure 14:
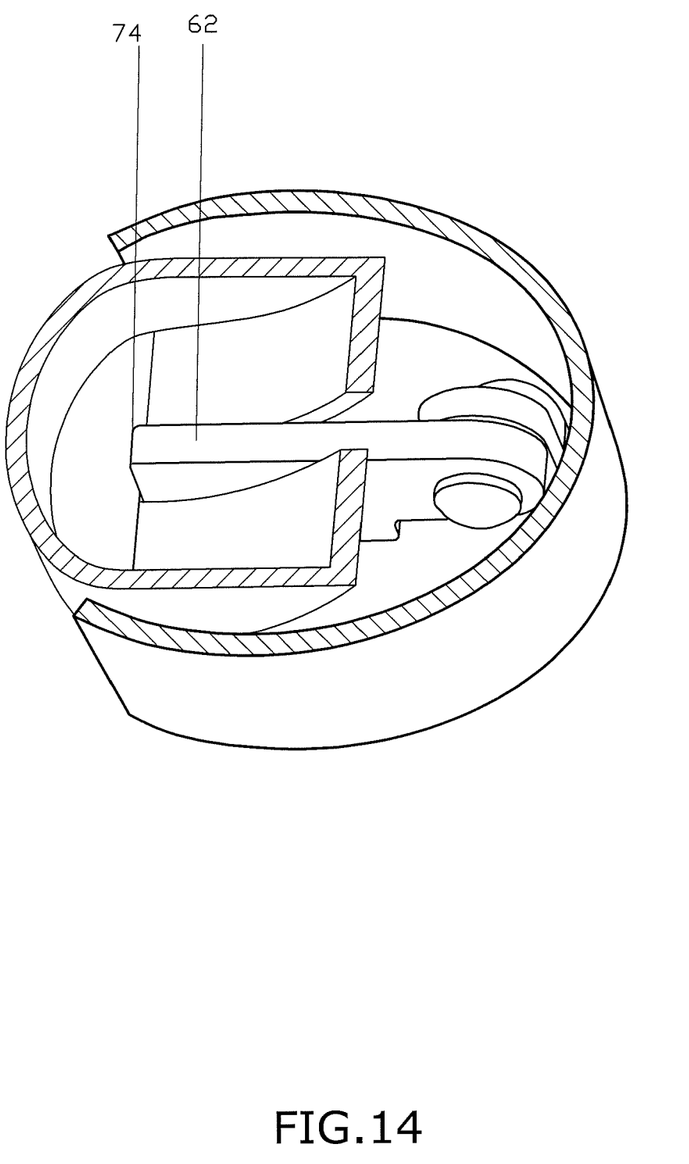
FIG. 14 is an enlarged perspective view showing the locking mechanism of the tongs of FIGS. 8 and 12 disposed in a locked configuration.

FIGS. 13 and 14 illustrate the locking mechanism in greater detail. From these figures, it is clearly shown that the lever 62 is relatively thin and has an elongate profile defining a longitudinal axis. The lever 62 is provided with an extension 82 perpendicularly protruding away from the longitudinal axis. In other words, the lever 62 generally resembles a plate in the form of an English letter "T", or inverted "T" when the tongs 52 are positioned in opposite orientation. The extension 82 of the lever 62 serves to align the lever 82 in a predetermined position such that it can engage with the guide 64. The elongate slot 78 has two opposite ends, namely a first end 84 arranged closer to the first pivot axis 70 and a second end 86 arranged closer to the end plates of the first and second members. In FIG. 13, it is shown that when the distal end 74 of the lever 62, in response to the orientation of the tongs 52, moves towards to the first end 84 of the slot 78 or the first pivot axis 70 and disengages from the guide 64 at the second end 86 of the slot 78, the first member 58 and the second member 60 become freely squeezable together or spreadable away from each other. This is because the lever 62 no longer engages with the guide 64 or restricts movement of the second arm 60. In FIG. 14, it is shown that when the distal end 74 of the lever 62, in response to the orientation of the tongs 52 and when the arms 58, 60 have been squeezed together, moves away from the first pivot axis 70 and engages with the guide 64, the first member 58 and the second member 60 become locked against each other.

It is to be understood that the working of both the tongs 2 shown in FIG. 1 and the tongs 52 shown in FIG. 6 can be achieved in a one-hand operation.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. For example, while the movable member as depicted in one of the embodiments may be a lever, any pivotable member adapted to be movable in response to orientation of the apparatus may be usable. Also, a skilled person in the art will be aware of the prior art which is not explained in the above for brevity purpose.

The invention claimed is:

1. A tong or clamp apparatus for picking up an object, comprising:
   a) a first member having a front end in the form of a first elongate arm and a rear end;
   b) a second member having a front end in the form of a second elongate arm and a rear end, the first member and the second member are pivotably connected together at a first pivot axis;
   c) a utility portion; and
   d) a rear portion including a locking mechanism for controlling configuration of the apparatus;
   wherein the locking mechanism includes:
   i) a lever pivotably connected to the apparatus and adapted to take a swinging course between a first position and a second position, in that in the first position the first arm and the second arm may be locked together and in the second position the first arm and the second arm are allowed to be freely movable relative to each other;
   ii) a guide defining a region at which the lever is movable within a range of distance; and
   wherein the apparatus is configured to assume:
   1) a first configuration in which the lever is engaged in the first position due to orientation of the apparatus and the effect of gravity on the lever such that the first arm and the second arm are locked against each other from movement; or
   2) a second configuration in which the lever having been disengaged from the first position, or engaging or engaged in the second position, due to orientation of the apparatus and the effect of gravity on the lever such that the first arm and the second arm are movable relative to each other.

2. An apparatus as claimed in claim 1, wherein, when the apparatus is oriented with the utility portion downwardly pointing and the rear portion upwardly pointing, the lever is positioned above the first pivot axis.

3. An apparatus as claimed in claim 1, wherein the lever is pivotably connected at the rear portion of the apparatus.

4. An apparatus as claimed in claim 1, wherein the lever is relatively thin and generally resembles a plate.

5. An apparatus as claimed in claim 3, wherein the lever is pivotably movable at a second pivot axis substantially parallel to the first pivot axis.

6. An apparatus as claimed in claim 5, wherein the rear end of the first member is provided with an end plate to which the lever is pivotably connected.

7. An apparatus as claimed in claim 6, wherein the lever is pivotably connected to the end plate via a protrusion member extending from the end plate.

8. An apparatus as claimed in claim 2, wherein the rear end of the second member includes the guide.

9. An apparatus as claimed in claim 8, wherein the region of the guide at which the lever moves in use is elongate and arch shaped.

10. An apparatus as claimed in claim 9, wherein the region of the guide is provided with a first end and a second end, the first end and the second end are disposed on opposite sides of the elongate guide.

11. An apparatus as claimed in claim 10, wherein the lever is generally elongate in shape and acts as a stopper, and wherein, in use, when the lever acts on the first end of the region of the guide the first arm and the second arm are locked against each other.

12. An apparatus as claimed in claim 1, wherein the lever generally resembles the English letter "T" or inverted "T".

13. An apparatus as claimed in claim 1, wherein in the first configuration, the apparatus is adapted to hold an object between the first and second arms, and in the second configuration the apparatus is adapted to arrange with the object positioned between the first and second arms or to release the object from the apparatus.

14. An apparatus as claimed in claim 1, wherein the rear end of the apparatus is configured to resemble a socket defining a cavity for containing the locking mechanism.

15. An apparatus as claimed in claim 14, wherein the lever and the guide are concealed in the socket from the surroundings at least visually.

16. An apparatus as claimed in claim 1, wherein, excluding the guide, the first member and the second member are free of means or moving parts for engaging the lever in position.

17. An apparatus as claimed in claim 1, wherein the apparatus is a pair of culinary tongs.

18. A tong or clamp apparatus, comprising:
   a) a first member having a front end in the form of a first elongate arm and a rear end;
   b) a second member having a front end in the form of a second elongate arm and a rear end, the first elongate arm and the second elongate arm are pivotably connected together at a first pivot axis;
   c) a utility portion; and
   d) a rear portion including a locking mechanism for controlling configuration of the apparatus;
   wherein the locking mechanism includes a pivotable member and a guide for restricting movement of the pivotable member; and
   wherein the apparatus is configured to assume:
   i) a first configuration in which the pivotable member is engaged in a first position due to orientation of the apparatus such that the first member and the second member are locked against each other from movement; or
   ii) a second configuration in which the pivotable member having been disengaged from the first position, or engaging or engaged in the second position due to orientation of the apparatus such that the first member and the second member are movable relative to each other.

19. An apparatus as claimed in claim 18, wherein the pivotable member is generally elongate in profile and pivotally connected to the rear end of the apparatus, and acts a stopper, such that when a distal end of the pivotable member acts on the guide the first member and the second member are locked against each other to prevent relative movement thereof.

20. A locking arrangement for locking two movable parts together or unlocking the two movable parts from each other, comprising:
   a) a first member having a front end and a rear end;
   b) a second member having a front end and a rear end, the first member and the second member are connected together at a first pivot axis at the rear ends thereof;
   c) a front portion; and
   d) a rear portion including a locking mechanism for controlling configuration of the arrangement;
   wherein the locking mechanism includes a pivotable member and a guide for controlling movement of the pivotable member;
wherein the arrangement is configured to assume:
   i) a first configuration in which the pivotable member is engaged in a first position due to orientation of the arrangement such that the first member and the second member are locked against each other from movement; or
   ii) a second configuration in which the pivotable member having been disengaged from the first position, or engaging or engaged in the second position, due to orientation of the apparatus such that the first member and the second member are movable relative to each other; and
wherein the pivotable member acts as a stopper such that when the pivotable member acts on the guide the first member and the second member are locked against each other to prevent relative movement thereof.

* * * * *